April 25, 1933.  J. PEKAR  1,906,090

ANTIGLARE DEVICE

Filed Aug. 23, 1932

INVENTOR.
JOSEPH PEKAR
BY
ATTORNEY

Patented Apr. 25, 1933

1,906,090

UNITED STATES PATENT OFFICE

JOSEPH PEKAR, OF BRIDGEPORT, CONNECTICUT

ANTIGLARE DEVICE

Application filed August 23, 1932. Serial No. 630,035.

This invention relates to new and useful improvements in anti-glare device for automobile headlights, and has for an object to provide a device to be applied to the headlights of automobiles to eliminate the glare which blinds approaching drivers but which will not prevent the headlights from fully illuminating the road.

Another object is to provide a device as stated and which is of simple construction and which may be easily and quickly applied to a headlight by unskilled persons and which may be manufactured and sold at a low price.

Other objects and advantages will become apparent from a consideration of the following detailed description taken in connection with the accompanying drawing, wherein a satisfactory embodiment of the invention is shown. However, it will be understood that the invention is not limited to the details disclosed but includes all such variations and modifications as fall within the spirit of the invention and the scope of the appended claims.

In the drawing:—

Figure 1:
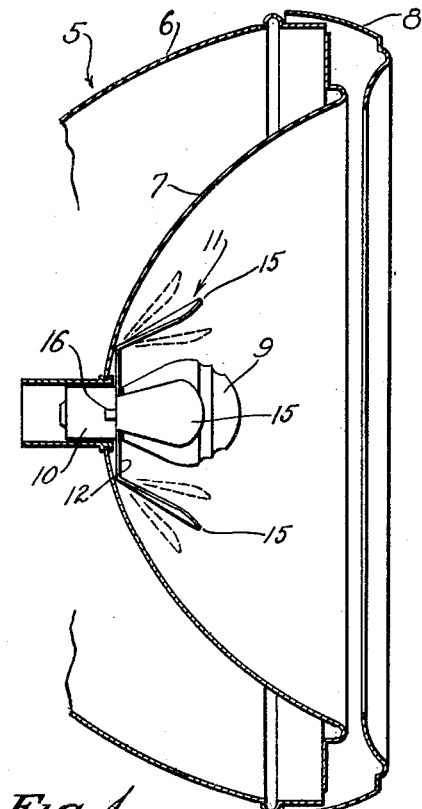
Fig. 1 is a sectional view through a headlight of any or the usual construction and showing the device of the invention applied thereto the device being shown in side elevation.

Referring in detail to the drawing, at 5 is generally indicated an automobile headlight which may be of any or the usual construction including a casing 6 within which is mounted a reflector 7 forwardly of which a lens (not shown) is held in place by a ring 8. The headlight 5 is equipped with any or the usual electric lamp 9 including a forward or globe portion and a rearwardly extending stem or base portion, the latter being indicated at 10.

My improved anti-glare device is generally indicated at 11 and comprises a disc-like body portion 12 which, if desired, might be slightly concavo-convex. Centrally the body portion 12 is provided with an opening 13 through which the stem 10 of the lamp 9 fits, and notches 14 are provided for the accommodation or for the passage of the small locking lugs or tits usually provided on the lamp stems.

Figure 3:
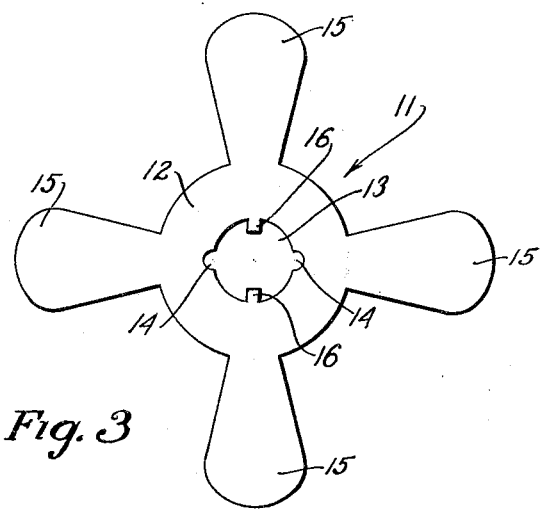
Fig. 3 is a plan view showing a blank before being folded to provide my improved anti-glare device.

The improved device 11 is usually stamped out in the form shown in Fig. 3 and is then bent to the desired shape. Extending radially from the body 12 at equally spaced points about the edge thereof are a series of panels 15, four such panels being shown. These panels are bent to extend forwardly with respect to the body portion 12 and preferably at an incline as most clearly shown in Fig. 1. Additionally, the panels are slightly curved transversely as also is clearly shown in this figure.

The entire device is blanked from a piece of non-springy bendable metal and it will be noted that the panels are relatively narrow at their juncture with the body portion 12, and that they increase in width so that their point of greatest width is in spaced relation to the body. Therefore, owing to the fact that the metal is not springy and may be bent to the desired shape and to the fact that the panels are relatively narrow at their juncture with the body, the said panels may be easily bent into the desired relationship to the body.

For example, in assembling the device, lamp 9 is removed and the device is positioned on the stem of said lamp and the latter is then replaced in the headlight 5. The panels of the device are extending forwardly at the sides of the lamp to a point which may be slightly beyond its center. As these panels are easily adjustable by bending them at their point of juncture with the body, said panels may then be bent to a position relatively close to the lamp or into a position at a greater incline thereto whereby to obtain the desired result in connection with any particular reflector.

Figure 2:
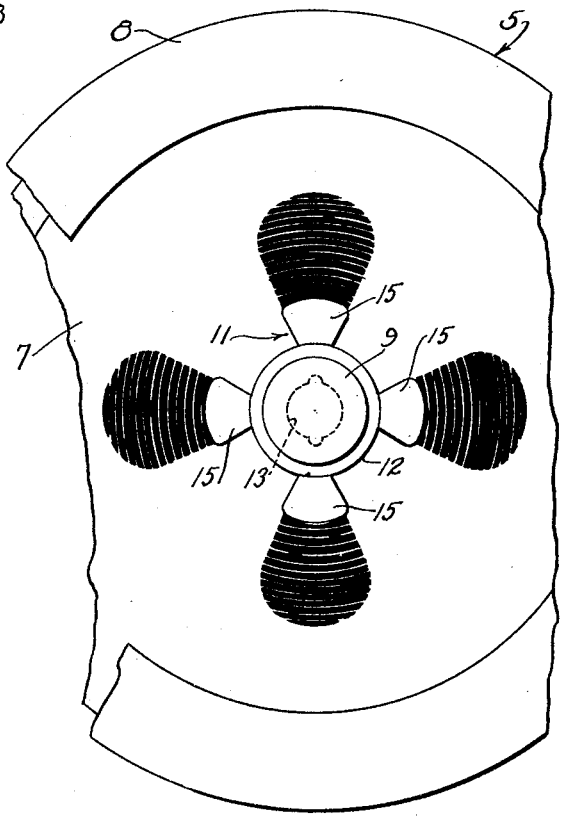
Fig. 2 is a front elevation view of a portion of a headlight equipped with the device of the invention.

When the device is in place and the lamp 9 is energized, a shadow is thrown on the reflector as indicated by the heavy black lines in Fig. 2. If the panels 15 are bent further toward the lamp, then a larger shadow is cast on the reflector and conversely, when the panels are bent and disposed at a greater distance from the lamp, smaller shadows are cast on the reflector. Therefore, since the metal of the device is not spring metal, the panels may be adjusted to the desired position and will remain in such position.

In Fig. 1, the dotted lines show the panels in two adjusted positions. In one, the panels are adjusted toward the lamp and in the other, they are adjusted from the lamp. To adapt the device for headlights having a different reflector and for headlights employing lamps of different candle-power, this adjustment, involving no additional parts, is extremely advantageous. Should the panels be relatively wide at their point of juncture with the disc-like body, then any attempt to fold the panels or bend them for adjustment would simply result in distortion and bending of the panels themselves or of the body.

However, since the panels are relatively narrow where they join the body, and since the metal is relatively soft, it is a simple matter to adjust the panel to the desired position. The effect of any adjustment made may be easily noted by the shadows cast on the reflector so that the device may not only be applied by unskilled persons but any adjustments may be made by these same persons, since the panels may all be given the same adjustment, as the effect of even a slight adjustment is readily noted by the change in the shadow. The panels, it will be noted, are spaced an appreciable distance apart throughout their length whereby the entire central portion of the reflector is not darkened since such action on the part of the device would so cut down the available illumination that the headlight would not effectively illuminate the road ahead of the vehicle.

In the present device, light and dark portions are provided about the center of the reflector with the result that the road will be fully illuminated, and yet there will be no blinding glare in the eyes of an approaching driver, and such glare, as is well known, frequently causes accidents. The device stays in place owing to engagement with stem 10 of the lamp 9 and small lugs 16 formed with the body 12 are arranged at the sides of the lamp stem to engage it and prevent wobbling of the device. Arms or panels 15 of the device do not come into engagement with the globe or glass portion of the lamp unless said arms are adjusted to an extreme darkening position in which position they will, as above noted, cast large shadows on the reflector. The inner surfaces of the device 11 may be plated or polished to make them reflecting surfaces and if desired, this same procedure may be followed with respect to the outer surfaces of the device.

Having thus described the invention what is claimed is:—

1. In an anti-glare device for use with a head-light having a reflector and an electric lamp including a stem portion, a body having a central opening for the passage of the stem of the lamp, said body of greater diameter than the bulb of the lamp, four equally spaced panels projecting from the edge of said body, said panels projecting forwardly of said body to be spaced from and disposed at the respective sides of the globe portion of a lamp having its stem extending through the opening in the body, said panels integral with the body but creased sharply at their connections with it and angularly disposed relative to the body, said body and panels of bendable metal, said panels being relatively narrow at their sharply creased juncture with the body and widest at a point spaced from the body whereby said narrowest portion provides a flexing point to permit the panels to be bent relative to the body to dispose the panels closer to or farther from the globe portion of the lamp, and said panels each of a length less than that of the globe of the bulb whereby the panels do not extend beyond the bulb and will not cast shadows on the edge portion of the reflector.

2. In an anti-glare device for use with a head-light having a reflector and an electric lamp including a stem portion, a body having a central opening for the passage of the stem of the lamp, said body of greater diameter than the bulb of the lamp, four equally spaced panels projecting from the edge of said body, said panels projecting forwardly of said body to be spaced from and disposed at the respective sides of the globe portion of a lamp having its stem extending through the opening in the body, a pair of lugs on said body and engaging the stem of said lamp to prevent the device from wobbling, said panels integral with the body, said body and panels of bendable metal, said panels being relatively narrow and sharply creased at their juncture with the body and widest at a point spaced from the body and approximately mid-way of the length of the lamp bulb whereby said narrowest portion provides a bending point to permit the panels to be bent relative to the body to dispose the panels closer to or farther from the globe portion of the lamp, and said panels each of less length than the globe of the lamp whereby the panels stop short of the outer end of the bulb and do not cast shadows on the edge portions of the reflector when the lamp is energized.

Signed at Bridgeport, in the county of Fairfield, and State of Connecticut, this 22nd day of August, A. D. 1932.

JOSEPH PEKAR.